Oct. 18, 1966 CHUICHI NAKAHARA 3,280,251
FACSIMILE EQUIPMENT
Filed Aug. 27, 1963
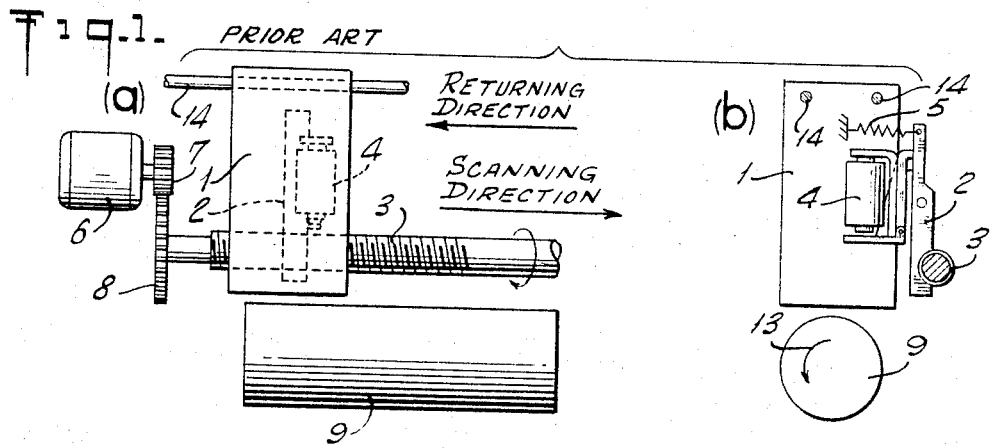
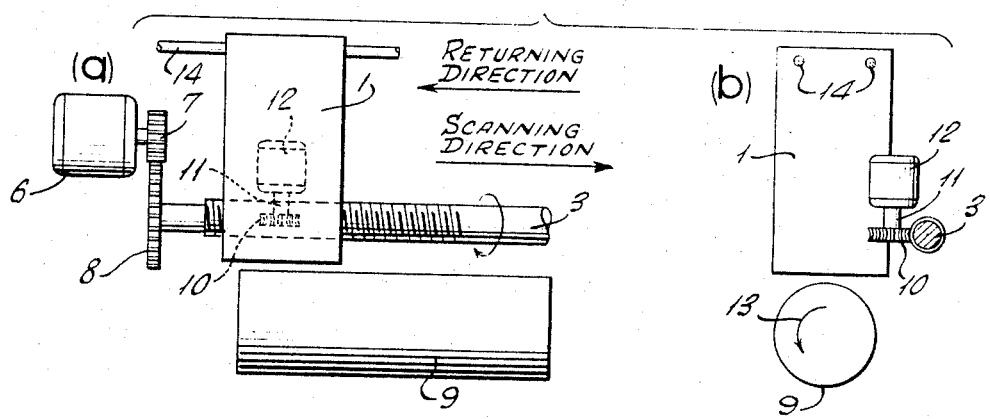
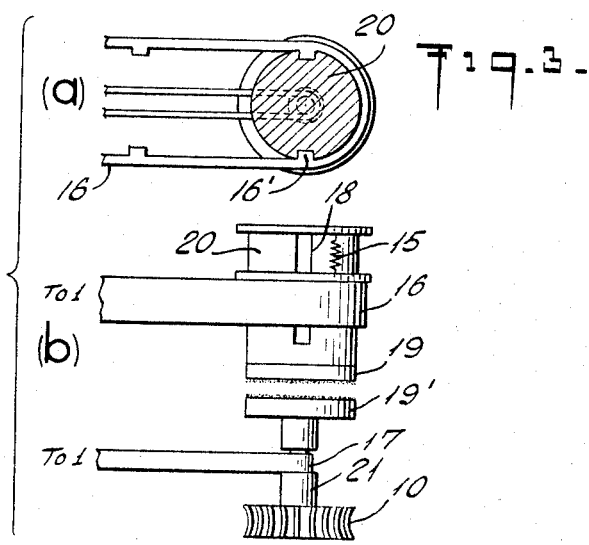
INVENTOR.
CHUICHI NAKAHARA
BY
ATTORNEYS 3,280,251
FACSIMILE EQUIPMENT
Chuichi Nakahara, Tokyo, Japan, assignor to Nippon Electric Company, Limited, Tokyo, Japan, a corporation of Japan
Filed Aug. 27, 1963, Ser. No. 304,859
Claims priority, application Japan, Aug. 31, 1962, 37/37,724
1 Claim. (Cl. 178—6)

This invention pertains to facsimile equipment and in particular to facsimile devices of the moving carriage and rotating drum type.

In drum scanning facsimile (hereinafter referred to as Fax) transmitters and receivers, the main scan is performed by the rotational movement of the drum relative to the scan-head or carriage while the sub-scan is accomplished by the relative movement of the scan-head longitudinally of the drum. Conventionally it has been a common practice to provide a driven feed or lead screw in parallel with the drum axis; sub-scanning resulting from the engagement, with the lead screw, of a half-nut affixed to the carriage. Sufficient force is applied to the engagement by a spring, the pressure of which is overcome upon disengagement by an electromagnet or solenoid.

The aforementioned arrangement, however, has several disadvantages. One is the gear wear and delayed starts caused by an improper mesh between the half-nut and the feed screw. Another is that upon automatic return, where the half-nut is disengaged, the force necessary to accomplish this disengagement must be provided by an electromagnet of sufficient strength to overcome the pressure spring.

Hence it is the object of this invention to provide a scan-head assembly which obviates the above defects while at the same time it is simple and economical.

Briefly, the invention is predicated upon the concept of replacing the half-nut with a member in continuous engagement with the feed screw and providing a clutch arrangement intermediate this member and the scan-head.

The above mentioned and other features and objects of this invention and the manner of attaining them will become more apparent and the invention itself will best be understood by reference to the following description of the invention taken in conjunction with the accompanying drawings wherein:

FIGURE 1 illustrates front and side views of a conventional Fax scan arrangement;

FIGURE 2 shows front and side views of a scanning mechanism according to the invention; and FIGURE 3 illustrates in detail an alternative worm wheel-clutch arrangement according to the invention; both side and top views are shown.

In order to lay a proper foundation for the explanation of the invention to follow, reference will first be made to FIG. 1 where a conventional arrangement is depicted. In FIG. 1 the scanning drum 9 is disposed with its axis parallel to the feed screw 3. The main drum is driven at constant speed, in the direction of the arrow 13, by a suitable motor-gear train arrangement (not shown). The scanning head assembly 1 meanwhile is caused to move in the direction of the lower arrow (on the scan cycle), to effect the sub-scan, and is driven as will be explained, by the motor-gear train-feed screw arrangement 6–7–8–3; thus effectuating a close spaced helical scan.

In order to perform the sub-scan, the electromagnet 4 is de-energized, and the scan-head is progressed to the right by virtue of the engagement of the half-nut 2 with rotating feed screw 3. The pressure to effect this engagement is provided by the spring 5. Upon return of the scan-head (by means not shown) the electromagnet 4 is energized, disengaging the half-nut 2, and making the movement of the scan head, along the guides 14, independent of the feed screw.

In FIG. 2 the arrangement according to the invention is shown, with corresponding numerals denoting parts similar to those of FIG. 1. In FIG. 2 it may be seen that the half-nut is replaced by the worm wheel 10, which is in continuous engagement with the feed screw 3. The other end of the shaft 11 of the wheel 10 is inside of an electromagnet 12. Hence, depending upon whether the electromagnet is energized or de-energized, the shaft 11 and thus the worm wheel 10, is either fixed or allowed to run idle, respectively. Since the electromagnet is fixed to the scanning head 1, a sub-scan may be effected by energizing the electromagnet; the wheel 10 thus remaining stationary (rotationwise), and the scan head being forced to the right by virtue of this wheel which now acts as a feed screw follower.

Where the scan head is to return, the electromagnet is de-energized and the worm wheel, having been declutched, simply idles along the feed screw, remaining in engagement therewith.

FIG. 3 illustrates an alternative embodiment of the invention. Inasmuch as the attendant mechanical apparatus has already been sufficiently described, only the worm wheel-clutch arrangement is shown. In the arrangement of FIG. 3 the worm wheel 10 is maintained in engagement with the feed screw by the bearing strap 17. The electromagnet 20 is fixed against rotation by the key-slot configuration of the outer surface of the electromagnet at 18 and the portion 16' of the strap 16. The electromagnet is free to move, however, in the longitudinal direction. In the figure the magnet is shown de-energized, maintained apart from the clutch portion 19', affixed to the end of the shaft 21, by the spring 15. Thus the scan-head is in condition for the "return."

To initiate the sub-scan, the electromagnet is energized, causing it to move in the direction of the worm wheel. The interfaces 19 and 19', which may be knurled or stepped to eliminate slippage, engage and the worm wheel 10 is forced to remain stationary, thus feeding the scan-head.

It is to be noted that in this embodiment the electromagnet must work against the spring 15. This, however, is of small moment as spring 15 is extremely light, serving only the function of lifting the electromagnet. Moreover, its use may be oviated by inverting the arrangement and using a gravity feed for a disengagement of the interfaces.

Thus, it may be seen that by employing the inventive concept, no wear in the gears or delay in the sub-scan is possible due to a mis-mesh. Further, the need for a heavy engagement spring (5) is non-existent and the electromagnet may thus be of decreased capacity.

While I have described above the principles of my invention in connecting with specific apparatus, it is to be clearly understood that this description is made only by way of example and not as a limitation to the scope of my invention as set forth in the objects thereof and in the accompanying claim.

What is claimed is:

In a drum scan facsimile equipment having a scan-head, and a feed screw, the feed screw being parallel and adjacent the drum for driving said scan-head longitudinally of said drum during subscan operation, the improvement therein for selectively causing displacement of said scan-head by said feed screw comprising a worm wheel, an axial shaft affixed to said wheel, means for maintaining said wheel in continuous engagement with said feed screw, clutch means including a first clutch member affixed to the end of said shaft opposite said wheel, and a second clutch member juxtaposed to said first clutch member and affixed to said scan head for longitudinal closure movement with respect to said first clutch member and substantially zero angular movement, means for biasing said first and second clutch members apart and electromagnetic means for closing said clutch members, thereby locking said wheel.

References Cited by the Examiner

UNITED STATES PATENTS 2,639,322  5/1953  Young _____ 178—7.11

DAVID G. REDINBAUGH, *Primary Examiner.*

J. A. ORSINO, *Assistant Examiner.*